United States Patent [19]

Rodish

[11] 4,301,961

[45] Nov. 24, 1981

[54] PLASTIC REINFORCED PAPER AND BAG MADE THEREOF

[75] Inventor: John Rodish, Fort Wright, Ky.

[73] Assignee: Polynovus Industries, Inc., Fort Wright, Ky.

[21] Appl. No.: 88,863

[22] Filed: Oct. 29, 1979

[51] Int. Cl.³ .................. B32B 7/14; B65D 33/02; B65D 29/04

[52] U.S. Cl. .................. 229/55; 428/195; 428/247; 428/255; 428/511

[58] Field of Search ................ 93/35 R, 35 MW; 428/105, 107, 108, 247, 255, 511, 109, 131, 134, 135, 138, 195; 229/DIG. 14, 55

[56] References Cited

U.S. PATENT DOCUMENTS

| | | | |
|---|---|---|---|
| 2,407,549 | 9/1946 | Gurwich. | |
| 2,653,090 | 9/1953 | Crandall | 428/293 |
| 3,248,041 | 4/1966 | Burke | 229/DIG. 14 |
| 3,257,915 | 6/1966 | Cartur et al. | 93/35 MW |
| 3,511,739 | 5/1970 | Hibberling | 428/108 |
| 3,554,368 | 1/1971 | Nagel | 93/35 MW |
| 3,600,262 | 8/1971 | Frank | 428/247 |
| 3,671,372 | 6/1972 | Hoffman | 428/108 |
| 4,096,304 | 6/1978 | Greengrass | 428/255 |
| 4,190,690 | 2/1980 | Rabeneck et al. | 428/255 |

FOREIGN PATENT DOCUMENTS 1158814 12/1963 Fed. Rep. of Germany .......... 93/35 MW

*Primary Examiner*—James J. Bell
*Attorney, Agent, or Firm*—Hauke and Patalidis

[57] ABSTRACT

Paper provided on one surface with a mesh-like pattern, for example a diamond-shaped pattern, or reinforcing extruded plastic material. The extruded plastic material is applied to the paper surface in the form of a plurality of narrow thin stripes or strands adhering to the surface and penetrating through the mass of the paper due to the porosity of the paper and drawing of the plastic material through the paper during application of the plastic stripes or strands by applying vacuum to the opposite surface of the paper. The reinforced paper of the invention is particularly useful for making good-carrying bags commonly used for carrying groceries and other purchased articles from a store.

21 Claims, 3 Drawing Figures

U.S. Patent    Nov. 24, 1981    Sheet 2 of 2    4,301,961
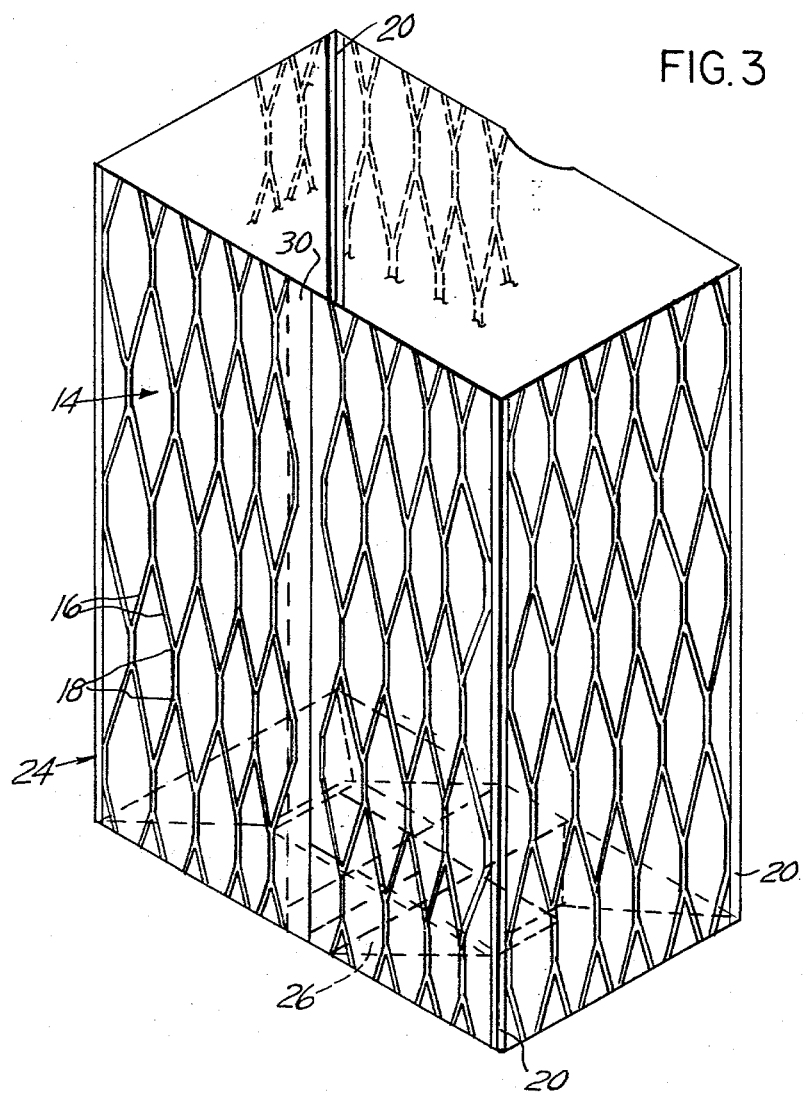
FIG. 3
FIG. 2
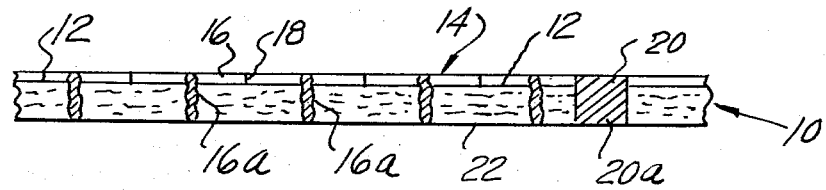

PLASTIC REINFORCED PAPER AND BAG MADE THEREOF

BACKGROUND OF THE INVENTION

This invention relates to plastic reinforced paper and to bags made of such paper.

Carry-out paper bags are convenient to assist customers in carrying out purchases made from grocery stores, market stores, liquor stores, hardwares and the like. The inconveniences of ordinary carry-out paper bags are many and well-known. They have limited load carrying capacity, they are easily torn by any sharp corner of the articles carried and, if exposed to wet or sweating surfaces, they tear very easily. The load carrying capacities of ordinary paper bags are so poor that it is often best to place two or more bags within each other before filling them with heavy articles, such as bottles and the like, and it is a good precaution for the customer to carry a loaded bag by holding it under its bottom panels rather than by grasping it at the top of its side panels.

It would therefore be advantageous to provide ordinary carry-out bags made of paper, such as the kraft or sulfate paper commonly used for making such bags, with a greatly improved load carrying capacity without substituting heavy-weight for light-weight kraft stock, without resorting to using two light-weight kraft paper blanks formed together in the form of a multi-layer bag called a "Duplex" bag, and without being subjected to almost immediate self destruction when wet.

Attempts have been made in the past at reinforcing paper or at providing reinforced paper shopping bags. For example, in U.S. Pat. No. 3,248,041 there is disclosed a reinforced multi-wall bag, in U.S. Pat. No. 2,653,090 there is disclosed a glass strand reinforced paper, and in German Patent Publication 2,263,624 there is disclosed a bag provided with reinforcing extruded plastic strands arranged laterally across each side of the bag proximate the carrying handle attached to the top of each bag side.

It is readily apparent that a reinforced multi-wall bag is relatively complex, costly to manufacture, and offer no savings in the tonnage of paper used for manufacturing a given number of bags, that duplex bags made of two light-weight kraft paper sheets formed together in the form of a bag do not provide improved strength as compared to a bag made of a single sheet of heavy-weight kraft paper, that glass strand reinforced paper wherein, the glass strand is embedded in the center of the mass of paper fiber requires that the glass strands be first made and be subsequently immersed in the paper pulp during the paper manufacture operation, and that forming reinforcing strands in a lateral direction across the sides of a bag has very little effect on increasing the load-carrying capacity of a paper bag, especially when wet.

SUMMARY OF THE INVENTION

The principal object of the invention is therefore to provide a reinforced paper, without changing paper making techniques, without modification of paper making machinery other than the addition of a relatively simple and low cost plastic reinforcement applying unit, without modification of bag making machinery presently existing, and without reduction in production rate. Another important object of the invention is to provide a paper bag having a substantial load-carrying capacity although made from a substantially light-weight kraft paper, thus considerably reducing the tonnage of raw material and the energy cost required for manufacturing paper bags.

The present invention accomplishes its objects by providing on a surface of a sheet of paper a regular mesh-like pattern of plastic reinforcing stripes or strands, preferably diamond-shaped or lozenge-shaped, increasing the tensile strength of the paper in a lateral as well as longitudinal direction, the stripes or strands of extruded plastic material being embedded at least partially through the thickness of the paper. The invention further provides longitudinal reinforcing stripes or strands of plastic coating on paper which is used for making bags and which provide reinforcement of the corners of the bags.

The many objects and advantages of the present invention will become apparent to those skilled in the art when the following disclosure of the best mode contemplated for practicing the invention is read in conjunction with the accompanying drawing wherein:

BRIEF DESCRIPTION OF THE DRAWING

FIG. 2 is a grossly exaggerated partial sectional view along line 2—2 of FIG. 1; and FIG. 3 is a perspective view of an example of bag made from the reinforced paper of FIGS. 1-2.

DETAILED DESCRIPTION OF THE PREFERRED EMBODIMENTS

Figure 1:
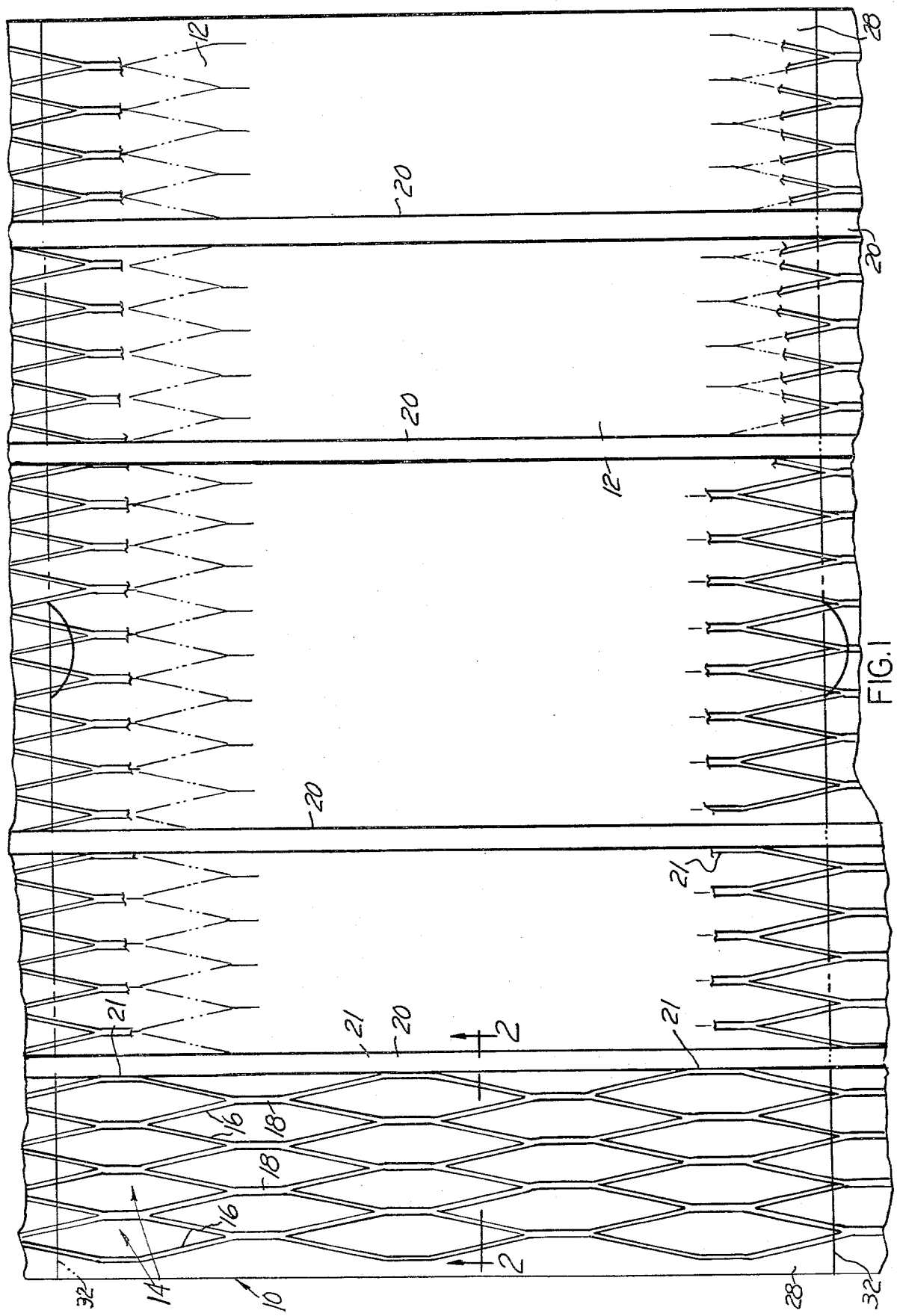
FIG. 1 is a plan elevation view of an example of reinforced paper, such as kraft paper, according to the present invention.

As illustrated at FIGS. 1-2 of the drawing, a reinforced paper according to the invention comprises essentially a web of paper 10 such as kraft or sulfate paper provided on a surface 12 with a mesh-like geometric pattern 14 formed by continuous stripes or strands 16 of thermoplastic material forming the mesh-like pattern in the shape of interconnecting or overlapping diamonds or lozenges. Preferably the thermoplastic material is a polyolefin, such as polyethylene or polypropylene, which is applied to the surface 12 of the substrate paper 10 while the paper is linearly displaced as a continuous web under two separate parallel rows of extrusion nozzles, each row of nozzles being supported proximate to the surface 12 of the paper 10 from a support bar which is caused to oscillate laterally, or perpendicular to the axis of motion of the travelling web of paper, at a predetermined frequency. The oscillatory motion of each support bar is appropriately timed and has an amplitude of oscillation such that the two adjoining stripes or strands 16 of plastic material of each pair, when applied to the surface 12 of the linearly moving continuous web of paper 10, interconnect or overlap, as shown at 18, at regular intervals.

When it is intended to use the reinforced paper of the invention for the manufacturing of article-carrying bags, such as grocery bags and the like, the surface 12 of the web of paper 10 is further provided with four relatively wide continuous stripes or strands 20 disposed in a straight line, and much larger in width than the strands 16 of plastic forming the overlapping lozenge- or diamond-shaped mesh 14, and connected to the stripes or strands 16 at regular locations as shown at 21. The relatively wide straight-line coating stripes or strands 20 are applied to the paper surface 12 by means of stationary extrusion nozzles disposed at an appropriate distance from each other, above the travelling web of paper, such that when a bag is manufactured from the reinforced paper of the invention, the straight-line relatively wide reinforcing stripes or strands 20 are disposed each at one of the four corners of the bag.

After the reinforcing pattern is applied to the surface 12 of the paper 10 being displaced longitudinally as a continuous web under the applicator nozzles, or simultaneously with the application of the pattern, the substrate paper is displaced over a vacuum plate which draws the hot melted plastic through the mass of the paper substrate, and the web of coated paper is fed between pressure rolls and subsequently air dried. The apparatus for coating the paper and for subsequently treating the paper is disclosed in detail in co-pending application Ser. No. 088,862, filed on the same date as the present application.

The resulting product is in section as illustrated in a grossly exaggerated thickness at FIG. 2. The surface 12 of the paper 10 is provided with a pattern 14 of plastic stripes or strands 16 and with wide longitudinal stripes 20 which, as a result of applying a vacuum to the other surface 22 of the paper 10 have been drawn through the pores of the paper substrate and the adjoining fibers forming the paper substrate generally to the other surface 22 of the paper, as shown at 16a and 20a. Application of pressure to the paper surface and application of heat during the drying step have resulted in literally fusing the plastic material to the paper fibers, such that a conventional grocery bag 24, FIG. 3, formed on a conventional bag forming machine, is provided considerable tensile strength, generally twice or more the tensile strength of the same bag made with the same weight kraft paper. Also, the bag 24 has considerably more resistance to moisture than would be normally the case with conventional grocery bags placed in contact with wet or sweating articles because, even though wetness may cause the tensile strength of the paper substrate to be substantially reduced, the fused plastic pattern 14 of stripes or strands 16 prevents lateral tearing of the bag as well as longitudinal tearing.

The bag 24, FIG. 3, is manufactured on conventional bag making machinery, the impregnated and fused pattern 14 having no effect on the folding operation of the bottom flaps 26 and on the glueing of the superimposed bottom flaps. Although the diamond- or lozenge-shaped pattern 14 may extend to the edge of the web of paper 10 of FIG. 1, it has been found more convenient to leave a lateral marginal area 28 on each side of the web of paper 10 uncoated, to prevent dripping of molten plastic from the edge of the paper web. The two marginal areas 28 are subsequently superimposed as shown at 30 at FIG. 3 and glued together at their adjoining surfaces to form, during the bag making operation, a tube of paper which is subsequently cut to an appropriate length, represented by phantom line 32 at FIG. 1, to form a paper bag tubular blank, one end of which is subsequently slit and appropriately folded, the resulting flaps 26 being glued together.

Although polyolefin resins, such as polyethylene and polypropylene, have been found particularly convenient as a plastic material for reinforcing paper according to the present invention in view of the facility with which polyolefin resins are hot-extruded and in view of their lack of brittleness, once set, which permits the reinforced paper to be folded without breaking the reinforcing plastic stripes or strands which are relatively pliable, it is readily apparent that the principles of the invention are applicable to other types of paper substrates, besides kraft or sulfate papers, and by so reinforcing paper, fabrics and like materials, many articles may be manufactured using a lower grade or thinner gage of paper or textile material.

As an example of applications of the present invention to the manufacture of grocery bags, grocery bags of 1/6 bbl. capacity are conventionally made from 65–75 lb. basis weight kraft paper, weighing 21.66 lbs. to 25 lbs. per thousands square feet. Approximately the same weight of base paper is used for manufacturing a duplex bag made of two lighter weight kraft papers formed together. A grocery bag of the same capacity may be manufactured from light-weight kraft paper, 40 lbs. of basis weight or less, weighing 13.33 lbs. per thousand square feet, reinforced as taught by the present invention. Such a bag has at least the same dry tensile strength as a bag made of 75 lb. basis weight kraft paper, and its tensile strength becomes only slightly less when wet, while a conventional paper bag has negligible tensile strength when wet. Typically, the stripes or strands 16 of plastic coating applied to the surface 12, FIG. 1 of the paper 10 are 0.060 to 0.080 in width and are at most about 0.001 in thickness after having been vacuum drawn through the mass of the paper and fused. The corner stripes 20 are approximately 0.600 to 0.800 in width, the distance between the overlapping or adjoining junctions 18 in the mesh pattern is typically of the order of 1.30 inch and the distance between consecutive rows of such junction areas 18 is typically about 4 inches.

It will be appreciated that the above numerical dimensions are given for illustrative purpose only and that the diamond- or lozenge-shaped pattern 14 may be of any appropriate suitable dimensions and shape, may be replaced by any appropriate closed mesh pattern, the smaller the size of the mesh of the pattern, the greater the strength of the substrate sheet material.

It will be further appreciated that although polyolefin resins such as polyethylene and polypropylene are the preferred thermoplastic resins for use in the present invention, other polyolefin resins may be also used as well as polyvinyl chloride, polystyrene, polyoxymethylene, polymethyl methacrylate, polyamides, polyesters, and polycarbonates, for example.

What is claimed as new is as follows:

1. A reinforced sheet material comprising a substrate and a plurality of relatively narrow pliable stripes of plastic material directly deposited on and adhering to a single surface of said substrate, said stripes forming a permanent closed mesh pattern regularly disposed on said surface, said plastic material forming said pattern being fused to said surface of said substrate where said stripes are located and at least a portion of said plastic material forming said pattern having penetrated into said substrate below said surface substantially directly under said stripes, whereby said substrate remains substantially unchanged where not so provided with said stripes.

2. The sheet material of claim 1 wherein said substrate is paper.

3. The sheet material of claim 1 wherein said plastic material is a polyolefin.

4. The sheet material of claim 1 wherein said pattern is in the form of adjoining intersecting lozenges.

5. The sheet material of claim 1 further comprising a plurality of parallel rectilinear stripes of said plastic material, said stripes forming said pattern having portions joined to said rectilinear stripes.

6. The sheet material of claim 5 wherein said rectilinear stripes are wider than said stripes forming said pattern.

7. The sheet material of claim 1 wherein said sheet material is paper and wherein said stripes are made of a polyolefin.

8. The sheet material of claim 5 wherein said sheet material is paper and wherein said stripes are made of a polyolefin.

9. The sheet material of claim 6 wherein said sheet material is paper and wherein said stripes are made of a polyolefin.

10. The sheet material of claim 5 wherein said rectilinear stripes are four in number and define the four corners of a bag made with said material.

11. The sheet material of claim 6 wherein said rectilinear stripes are four in number and define the four corners of a bag made with said material.

12. The sheet material of claim 7 wherein said rectilinear stripes are four in number and define the four corners of a bag made with said material.

13. The sheet material of claim 8 wherein said rectilinear stripes are four in number and define the four corners of a bag made with said material.

14. The sheet material of claim 9 wherein said rectilinear stripes are four in number and define the four corners of a bag made with said material.

15. A paper bag made of the reinforced paper material of claim 2.

16. A paper bag made of the reinforced paper material of claim 7.

17. A paper bag made of the reinforced paper material of claim 8.

18. A paper bag made of the reinforced paper material of claim 9.

19. A reinforced shopping bag comprising a length of paper having a single surface provided with a permanent regular pattern of stripes of plastic material directly deposited thereon and fused thereto, with at least a portion of said plastic material impregnating said paper directly below said stripes, said regular pattern forming a closed mesh pattern leaving portions of said surface uncoated by said plastic material, and said pattern comprising four parallel substantially wider rectilinear stripes of said plastic material deposited on said surface and joined with portions of said closed mesh pattern, said rectilinear stripes being disposed at each corner of said bag when said length of paper is formed as a rectangular tube for defining said bag with an end of said rectangular tube being folded in the form of flaps attached together by means of an adhesive for forming the bottom panel of said bag.

20. The bag of claim 19 wherein said plastic is a polyolefin.

21. The bag of claim 20 wherein said polyolefin is selected from the group consisting of polyethylene and polypropylene.

* * * * *